United States Patent [19]
Gürs

[11] 3,897,590
[45] July 29, 1975

[54] METHOD AND APPARATUS FOR MAKING MONOCRYSTALS

[75] Inventor: Karl Gürs, Niederhochstadt, Germany

[73] Assignee: Battelle Development Corporation, Columbus, Ohio

[22] Filed: May 3, 1972

[21] Appl. No.: 249,998

Related U.S. Application Data

[63] Continuation-in-part of Ser. No. 825,345, May 16, 1969, abandoned.

[30] Foreign Application Priority Data
May 18, 1968 Germany.......................... 1769405

[52] U.S. Cl................ 13/1; 13/DIG. 1; 23/301 SP; 204/DIG. 11; 252/62.9
[51] Int. Cl.²... B01J 17/08; B01J 17/18; H01S 3/00
[58] Field of Search ............ 13/1, DIG. 1; 252/62.9; 117/212; 23/301 SP; 204/DIG. 11

[56] References Cited
UNITED STATES PATENTS

| | | | |
|---|---|---|---|
| 3,267,529 | 8/1966 | Gruber et al. ................... | 13/DIG. 1 |
| 3,278,274 | 10/1966 | Liebmann et al. ............... | 13/DIG. 1 |
| 3,278,274 | 10/1966 | Liebmann et al. .............. | 23/273 SP |
| 3,423,686 | 1/1969 | Ballman et al................ | 252/62.9 X |
| 3,477,959 | 11/1969 | Colton......................... | 23/301 SP X |

FOREIGN PATENTS OR APPLICATIONS

| | | | |
|---|---|---|---|
| 775,986 | 5/1957 | United Kingdom............. | 13/DIG. 1 |

*Primary Examiner*—R. N. Envall, Jr.
*Attorney, Agent, or Firm*—Sughrue, Rothwell, Mion, Zinn & Macpeak

[57] ABSTRACT

Producing dielectric monocrystals of salts of coordinative bound metal acids by the floating zone melt method wherein materials in the floating zone are melted by irradiation with a laser beam.

31 Claims, 10 Drawing Figures

PATENTED JUL29 1975 3,897,590

SHEET 1

Inventor
KARL GÜRS

BY
*Sughrue, Rothwell, Mion, Zinn & Macpeak*
ATTORNEYS

Inventor
KARL GÜRS

BY
Sughrue, Rothwell, Mion, Zinn & Macpeak
ATTORNEYS

METHOD AND APPARATUS FOR MAKING MONOCRYSTALS

CROSS REFERENCE TO RELATED APPLICATION

This application is a continuation-in-part of U.S. application Ser. No. 825,345, filed May 16, 1969, now abandoned.

BACKGROUND OF THE INVENTION

1. Field of the Invention

This invention relates to a method and apparatus for making monocrystals from materials that have a high melting point, particularly those having a melting point higher than 2,000°C, in accordance with the floating zone melting method.

2. Description of the Prior Art

Representative prior art zone melting processes are described in various publications, e.g., British Pat. No. 775,986, U.S. Pat. Nos. 3,267,529 Gruber et al, 3,287,107 Eaton and 3,224,844 Gerthsen.

For instance, British Pat. No. 775,986 discloses a zone melting process where low melting point semiconductor materials e.g., silicon or germanium are converted to monocrystalline form by heat from a heating ring, arc lamp or by induction heating. For practical usage the entire apparatus must be enclosed in a vacuum or protective inert atmosphere.

U.S. Pat. No. 3,267,529 Gruber et al discloses the zone melting of a metal rod under high vacuum using electron beams or by an arc or high frequency source of energy. The electron beams must originate in the vacuum.

U.S. Pat. No. 3,287,107 Eaton is very similar to U.S. Pat. No. 3,267,529 Gruber et al but provides for applying mechanical vibrations to the metal during zone melting by electron bombardment under high vacuum.

U.S. Pat. No. 3,224,844 Gerthsen discloses the zone melting of metal compounds, e.g., aluminum oxide, where the molten zone is heated by an arc discharge. A special atmosphere and electrode system are required in the Gerthsen process.

Cumulative to the above prior art are references such as U.S. Pat. No. 3,250,842 Hikido, teaching the use of an electron beam furnace and crucible to produce a ring shaped crystal; Russian Pat. No. 147,576, teaching the use of an electron furnace as a heating source; and U.S. Pat. No. 3,234,009 Siebertz, teaching the use of, e.g., an arc lamp as a heating source in a zone melting process. None of these references overcome the faults of the heretofore discussed prior art.

It can be seen it is thus known to produce various monocrystals, such as germanium and silicon, by the method of floating zone melting. However, the applicability of this method is limited for various reasons. Often it is impossible to heat the primarily rod-shaped material to such a temperature that a melting zone will develop. This problem is essentially due to two causes: first, some materials do not sufficiently absorb the high-frequency energy customarily used for heating; and, second, the melting point of the materials is so high that it cannot be reached, even upon full absorption of the high-frequency energy typically utilized.

It is likewise impossible to melt crystals with a high melting temperature via indirect heating by means of heat irradiation using a resistance heating device which, for instance, surrounds the rod-shaped material. This is due to the fact that the required high melting temperatures cannot be attained in this fashion.

The prior art processes discussed above, while considered by many in the art an improvement over the well known crystal-pulling processes (see, e.g., U.S. Pat. Nos. 3,305,485 Burmeister et al; 3,346,344 Levenstein et al; 3,360,405 Keller) are not only subject to the general faults discussed above, but suffer from more serious defects which greatly limit their range of applicability. Firstly, the practice of the heretofore discussed prior art zone melting processes requires extremely complicated equipment since, e.g., electron beam sources must be enclosed in a vacuum, leading to bulky, unpractical apparatus. Secondly, arc discharge means invariably introduce impurities from the arc source into the monocrystal being formed. Thirdly, with processes which require a vacuum it is impossible to produce monocrystals from many types of materials, e.g., those which have a high vapor pressure so they vaporize in a vacuum, those which sublimate in a vacuum, and those which undergo a chemical change when heated in a vacuum. Fourthly, in accordance with the prior art it has heretofore been believed impossible to produce large monocrystals by a zone melting process from materials as are processed in the present invention by the use of a laser.

While it has, of course, been known that lasers can be used to cut, melt and weld metals, e.g., see Miller, Welding Journal, June, 1965, pages 480 to 485, Sullivan, British Welding Journal, August, 1967, pages 443 to 445 and Industrial Heating, February, 1963, pages 262 to 264, 266 and 387, the prior art has not visualized or suggested that the numerous faults of prior art zone melting processes can be solved and monocrystals of a new class of materials formed by conducting a zone melting process using a laser beam to selectively form the molten zone.

SUMMARY OF THE INVENTION

The present invention provides a process and apparatus which will make it possible to remelt materials and to enable the production of monocrystals from materials which have a high melting point and/or which absorb high-frequency energy in an insufficient extent, specifically, non-metals (dielectrics) which have heretofore not been believed convertible to monocrystalline by a zone melting process due to their extremely high melting point.

In addition, the process of the present invention is not subject to any restrictions on the type of atmosphere required, i.e., it can be practiced under vacuum, under a protective atmosphere or in the air. High melting point materials which, because of their particular characteristics could not be zone-melted under vacuum, can thus relatively easily be converted to monocrystalline form. In contrast to the prior art according to the invention, it is easily possible to surround the rod with the molten zone with a for instance tubular furnace, thus reducing the radial temperature gradient and obtaining essentially strain free crystals of much better optical quality than heretofore.

The invention also offers the advantage to insert electrodes into the furnace so that the crystal may be drawn under the influence of an electric field. If the crystals to be drawn are electro-optic ones, this leads to single domaine crystals.

The electro-optic crystals (e.g. lithium niobate) can be used for light modulation, other crystals of the material in question for non-linear optics, e.g. for frequency mixing and generation of harmonics (barium natrium niobate). Barium strontium niobate monocrystals can be used for pyroelectric detectors, lead molybdate monocrystals for instance for optoacoustic purposes and yttrium aluminum garnet as laser crystals.

The present invention thus provides an improved, simplified floating zone melt method of manufacturing monocrystals wherein the raw materials comprising the zone are melted by irradiation with a laser beam.

The invention finds application in the formation of dielectric monocrystals from salts of coordinative bound metallic acids which may have a melting point even greater than 2,000°C.

A salt is any of numerous compounds formed by replacement of a part or all of the acid hydrogen by a cation (metal or compound acting like a metal). The remainder of the acid is named anion.

The present invention comprises salts where the cations are selected from the group consisting of (1) alkalis (lithium, sodium, potassium, rubidium and caesium), (2) alkaline earth metal (beryllium, magnesium, calcium, strontium, barium), and (3) rare earth metals, and the anions called metallic acids or precisely metallic oxygen acids are complex compounds between oxygen and the metals titanium, zirkonium, vanadium, niobium, tantalum, chromium, molybdaenum or tungsten and mixtures of different anions as mentioned above and cations thereof. Included are also the so-called amphoteric elements boron, aluminum, scandium, gallium, yttrium and indium which can be used as cations or complex oxide anion.

These salts are coordinative bonded what describes a covalent chemical bond by exchange of electrons. They exhibit dielectric properties (no conductivity by means of free electrons) and non-linear optical activity.

It is thus an object of the invention to provide an improved floating zone melt process for the production of monocrystals from dielectric salts of coordinative bound metallic acids.

A further object of the present invention is to provide an improved floating zone melt process for the production of relatively large monocrystals of dielectric salts of coordinative bound metallic acids wherein substantially pure monocrystals illustrating a tremendous reduction in thermal stress can be formed.

Another object of the present invention is to provide an improved floating zone melt process for the production of monocrystals from dielectric salts of coordinative bound metallic acids wherein materials heretofore impossible to form into monocrystals can be utilized.

Still another object of the present invention is to provide an improved floating zone melt process wherein such monocrystalline materials having varying shapes may be produced.

A further object of the present invention is to provide the art with a unique monocrystalline product produced by the process of the present invention.

A final object of the present invention is to provide novel apparatus for accomplishing the described improved floating zone melting process for the production of the described monocrystalline materials wherein a laser beam is utilized.

DESCRIPTION OF THE PREFERRED EMBODIMENTS

According to the present invention, the heretofore discussed problems are solved by melting the materials in the form of zones by the use of a laser beam.

The use of a laser beam makes it possible to heat every known material far above its melting point, or if desired, to even vaporize it. This result is achieved because of the high power density which is obtainable in a laser beam. Because a laser beam is spatially coherent, it can be focused to a very high degree, thereby yielding a beam of high energy concentration which is limited only by the diffraction of the electro-magnetic wave. Further, there are no fundamental physical limitations on the level of the power or power density that can be produced. So far, laser output levels of up to about 18 kw have been attained, thereby making it possible to generate temperatures which could not previously have been achieved in a zone melting process.

According to the method involved in this invention, dielectric monocrystals are formed from high melting point salts of coordinative bound metallic acids in accordance with the floating zone melt process where the floating zone is produced by melting with a laser beam. Illustrative of such high melting point salts of coordinative bound metallic acids are niobates such as barium sodium niobate ($Ba_2 Na Nb_5 O_{15}$), barium strontium niobate ($Ba_{0.3}Sr_{0.7}Nb_2O_6$) and lithium niobate ($li Nb O_3$); tantalates such as potassium ortho tantalate ($K Ta O_3$); titanates such as strontium titanate ($Sr Ti O_3$); wolframates such as calcium wolframate ($Ca W O_4$); molybdates such as lead molybdate ($Pb Mo O_4$); gallates such as yttrium gallate ($Y_3 Ga_5 O_{12}$); aluminates such as yttrium aluminates ($Y al O_3$ or $Y_3 Al_5 O_{12}$) and silicates such as yttrium silicate (Eulytite $Y_4 Si_3 O_{12}$). It has heretofore been impossible to produce dielectric monocrystals from such materials by the known zone melt processes, i.e. with superior purity, optical quality and with a relatively simple method. In the case of a material which is more easily vaporized, the growing process can take place in a closed and heated pressure chamber so that the vaporization of the easily vaporizing material can be controlled.

The method according to this invention offers an advantage in that the crystals can be made without any contact between the melt and a crucible material or heating flame, whereby contamination from the outside can be prevented. The crystals can be grown either in a vacuum or under a protective gas because of the use of an energy supply which does not "contact" the crystal material. Operation in the atmosphere is also possible.

The method according to this invention also makes it possible to process substances one of whose components has a higher vapor pressure relative to the melting point of the desired compound. In such cases it is necessary to perform melting, according to this invention, in a high pressure chamber in such a manner that the volatile component will have a vapor pressure that can be determined from the phase diagram for the material(s). This pressure can, if necessary, be adjusted by means of a solid or molten material of the volatile compound and temperature control. As indicated above, in order to maintain equilibrium between the melt and the vapor phase, the growing process in this case must be conducted within a closed and heated pressure chamber. The vapor pressure of the volatile component in this pressure chamber will be determined by the lowest temperature within the chamber. At the place of the lowest temperature a piece of solid or molten material of the volatile component should be deposited, the temperature of which must be controlled to compensate the vapor pressure of the liquid molten zone. It is thus possible to insure that the same amount of material which vaporizes out of the molten zone will be deposited into the melt from the vapor phase. In the case of a two (or more) component melt, the temperature of the melt for a certain vapor pressure due to the phase interrelationship existing (best shown by a phase diagram).

Preferably, the laser beam, according to the invention, is produced by a $CO_2$ laser (most preferred: 10.6 micron wavelength), which has a particularly high efficiency, i.e., one which is greater by a factor of 10 to 1,000 than other lasers that might come under consideration for industrial uses. Its overall efficiency is about 15–20 percent. Generally, for any laser used, it is most preferred that power density be greater than about $10^4$ watts/cm$^2$.

The laser beam can be focused on the melting zone substantially without any energy loss; therefore, the efficiency of the conversion from electrical to thermal energy, in the method according to this invention, is greater than in known methods. Finally, the directed irradiation of the laser beam facilitates a comparatively simple design for the crystal growing apparatus. The laser beam can be irridiated through a small recess or opening in the housing of the growing apparatus and thus focused directly at the material to be grown. Of course, the beam can be continuous or repetitively pulsed.

Further details, features, and advantages of the present invention are given in the following description of a preferred example, which description should be read in combination with the schematic drawings in which there is shown growing apparatus for making monocrystals by using a laser beam as the energy source.

Figure 1:
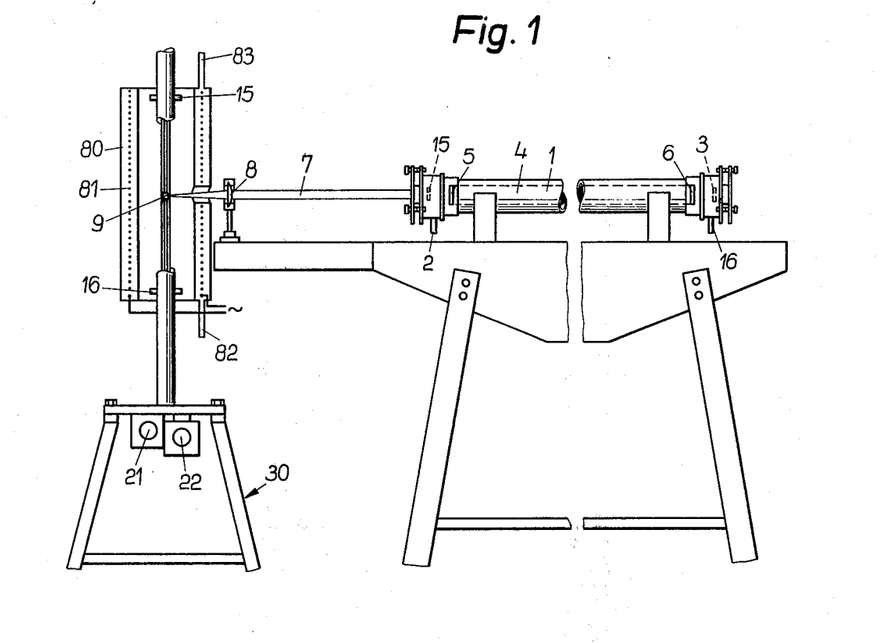
FIG. 1 is a side view of growing apparatus useful in the practice of the present invention.

As shown in FIG. 1, there is provided a $CO_2$ laser 1 utilizing flowing gas. The gas enters a laser tube 4 through an inlet pipe 2 and leaves the tube via outlet pipe 3. The filling pressure of the laser tube 4 is regulated by the suction speed of a pump and by dosing valves, not shown. It should be noted that $CO_2$ lasers using a stationary gas can also be used. In this case, pipes 2 and 3 are closed. The $CO_2$ laser 1 can be powered with DC or AC voltage applied across electrodes 5 and 6.

The laser tube 4 is provided with laser reflectors 15 and 16 on both ends. Laser reflector 15 is so designed that it allows the laser beam 7 to pass out of the tube in the direction towards lens 8. This result can be achieved by making reflector 15 either a fully reflecting mirror with a hole in the area of its middle or a partially transmissive mirror.

In place of a laser tube with reflectors adjustably arranged on both ends, one can also use a tube which has Brewster plates on both ends in which case laser reflectors are then positioned in an adjustable manner outside the tube.

By arranging various intermediate electrodes, not shown, between electrodes 5 and 6 in laser tube 4, it is possible to stimulate the $CO_2$ laser in a segment by segment manner, and thus reduce the operating voltage required.

Laser beam 7, which emanates from laser tube 4 in the course of operation, is focused by means of lens 8 — e.g., a germanium lens or a reflector, toward a melting zone 9 of a material arranged in the actual growing apparatus 30.

Figure 2:
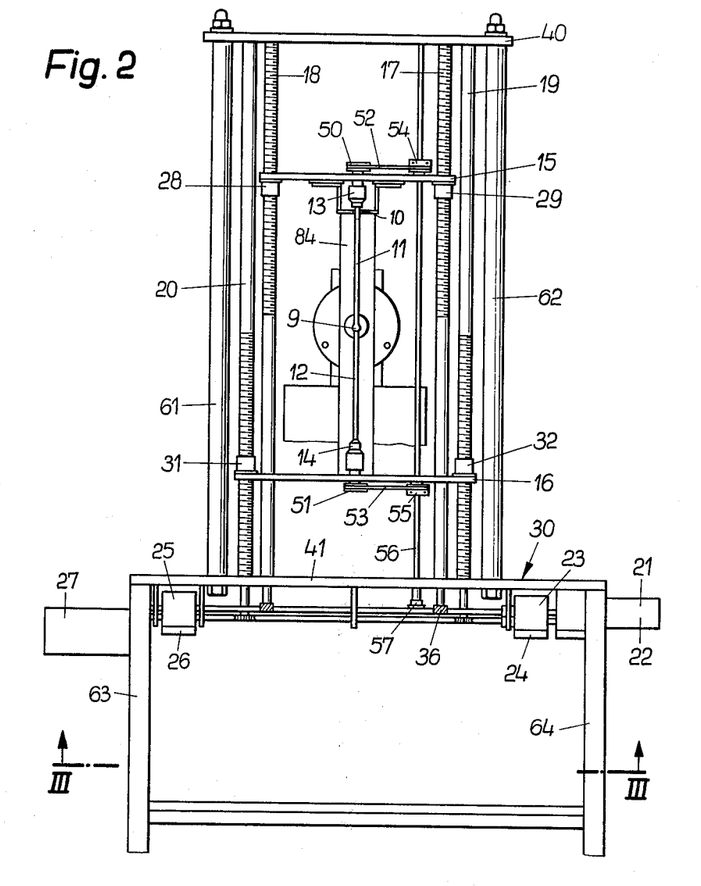
FIG. 2 is a front view of the growing apparatus of FIG. 1.

As shown more clearly in FIG. 2, melting zone 9 extends through the minor axis of the rod-shaped material and separates an already grown monocrystal rod 11 from a blank 12 of the rod-shaped material to be grown. For better mixing of the melt, monocrystal line rod 11 and blank 12 can be rotated against each other.

With a seed crystal 10 of a desired orientation, the crystal can be grown along the very same orientation of the seed crystal. In the example shown here, the seed crystal is clamped in the growing device on top and the blank at the bottom. One could reverse this arrangement, although one must then also change the direction of growth.

The melting zone 9 which extends through the minor axis of the rod to be melted must be guided through the material to be melted. This guidance is achieved either by mechanically moving the laser or optically moving the laser beam (by means of reflectors, for instance) or by shifting the rod along its longitudinal axis, thereby advancing the position of the melt.

In the example illustrated (FIGS. 1 and 2), the seed and the material (blank 12) to be grown are held in two clamps 13 and 14 which are rotatably mounted on platforms 15 and 16, respectively. Fixed to the ends of platform 15 are threaded nuts 28 and 29 which are threaded on threaded spindles 18 and 17. In like manner, fixed to the ends of platform 16 are threaded nuts 31 and 32 which are threaded on threaded spindles 20 and 19, respectively. By rotating the spindles, it is possible to move platforms 15 and 16 either synchronously, i.e., at a constant distance, or at different speeds upward or downward. If the speed is different, the monocrystal grown will be either thicker or thinner than blank 12. This difference in thickness is distinct from any volume change which occurs due to the escape of air or gas, for instance, when sinter rods are converted into monocrystals.

Figure 3:
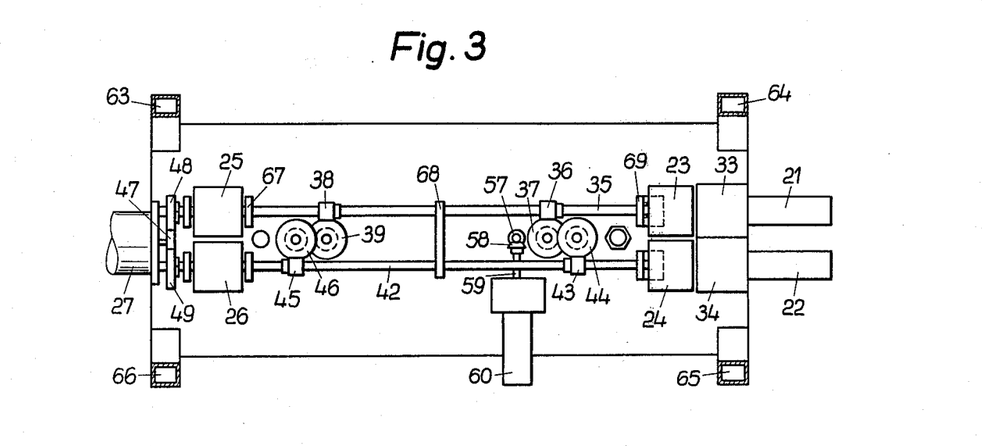
FIG. 3 is a cross sectional view along the line III—III of FIG. 2.

Looking also at FIG. 3, it can be seen that spindles 17, 18 and spindles 19, 20 are driven by reversible motors 21 and 22, respectively; the speed of these motors can be adjusted continuously. Reversible motor 21 is connected through gears 33 and magnetic coupling 23 to shaft 35 which drives spindle 17 via a worm gear 36 and a worm wheel 37. Shaft 35 also drives spindle 18 via a worm gear 38 and a worm wheel 39. All spindles are rotatably positioned in a top bar 40 and in a base plate 41. Platform 15 is moved by the rotation of spindles 17 and 18.

Platform 16 is driven in a similar manner with motor 22 being coupled through gears 34 and a magnetic coupling 24 to a shaft 42 to drive worm gears 43, 45 and worm wheels 44, 46. The pitch of the threads or teeth of the spindles, as well as of the worm gears, and the design of the reversing motors and their gears are chosen such that a maximum platform speed of 20 mm/hour can be achieved. However, in order to obtain greater speeds for initially setting up the platforms, means is provided for driving each shaft 35, 42 at a higher speed (such as an overdrive). For this purpose, there is provided another electric motor 27 which drives shafts 35, 42, via a bevel gear 47, tooth wheels 48 and 49 and a pair of electromagnetic couplings 25 and 26.

If the spindles are to be driven via electric motor 27, then the electromagnetic couplings 25, 26 are energized to engage shafts 35, 42, while electromagentic couplings 23, 24 are de-energized to be disengaged from shafts 35, 42. In the opposite case, electromagnetic couplings 25, 26 are disengaged whereas electromagnetic couplings 23, 24 are engaged so that reversible motors 21, 22 drive shafts 35, 42.

To attain optimum synchronous operation for both platforms, 15, 16, the two shafts 35, 42 can however also be driven via a single reversing motor, e.g., motor 22. Then electromagnetic coupling 23 is disengaged while electromagnetic couplings 24, 25, 26 are engaged; in this case, electric motor 27 idles.

As stated above, the material to be processed, i.e., blank 12, is held in clamp 14 while the seed crystal 10 is held in clamp 13 with the already monocrystalline-grown rod 11. In the example illustrated, these clamps are drill chucks. Clamps 13, 14 are rotatably mounted in platforms 15 and 16 respectively. Clamp 13 is placed in rotation via a pulley 50, a transmission belt 52, and another pulley 54 which is likewise rotatably mounted on platform 15. Through pulley 54 extends a bar 56, such as a square-section rod or other rod keyed to the pulley to rotate with it. Bar 56 is also rotatably positioned between upper bar 40 and base plate 41. At the end facing toward plate 41, the bar 56 has a bevel gear drive 57, 58 which is connected with another electric motor 60 via a shaft 59. Clamp 13 on platform 15 is driven by this electric motor 60 in the manner described above.

At the same time, bar 56 also drives clamp 14 which is likewise rotatably mounted in platform 16. Clamp 14 is driven in the same manner, as described above for clamp 13, via a pulley 51, transmission belt 53, and pulley 55.

If clamps 13 and 14 are to counterrotate, one of the transmission belts 52, 53 is placed on its pulleys in a cross fashion while the other belt is not crossed.

The fit of bar 56 in pulleys 54, 55 is so selected that an axial movement is possible with driven platforms 15, 16, in spite of the drive of the pulleys, via the bar.

It remains to be noted that upper bar 40, in which spindles 17 to 20 are rotatably supported, is firmly connected via columns 61, 62 with base plate 41.

Base plate 41 is supported by four lets 63, 64, 65 and 66. Furthermore, mounted on base plate 41 via bearing blocks 67, 68, 69, are the shafts 35 and 42 as well as motors 21, 22, 27, 60.

It has furthermore proved practical to keep the radial temperature gradient as small as possible in the growing crystal. In this way strains and non-homogeneities can be avoided in the grown crystal. The radial temperature gradient is reduced by surrounding the rod with a furnace 80 (FIG. 1). This additional heating is quite effective, for instance, in growing crystals when the rod is preheated to elevated temperatures without laser heating.

Furnace 80 has two spaced walls between which there is a heating coil 81. The space for the heating coil 81 can be filled with a buffer gas through an inlet pipe 82; this gas is evacuated through an outlet pipe 83.

Another way of reducing radiation loss and the resultant radial temperature gradient is by the use of a concave reflector 84, in form of a cylinder or sphere, instead of furnace 80, as shown in FIG. 2.

For raw rods, one can use pressed rods and sinter rods, as well as polycrystalline and monocrystalline rods of low quality.

The improved floating zone melting method according to this invention furthermore enables one to make monocrystalline molded parts, e.g., pipes and disks, with lasers. It is known that such parts cannot be grown from a crucible.

Surface tension will always create traction forces which result in the greatest possible symmetry that can be produced independent of the shape of the seed crystal used. Thus, a circular-cylindrical rod develops from the seed crystal According to the method of this invention, one can, by suitable shaping the seed crystal and the blank according to the end form desired, cause to develop between them a liquid zone with a vertical tangent along the phase boundary where the crystallization takes place, so that the crystal thus grows in the predetermined form. In this instance rotation of the nucleus and blank with respect to each other is generally not utilized. Of course, a long-drawn-out melting zone in a large disk is obtained only with a corresponding higher laser output: one must work with several lasers or one must expand the output of a high-power laser with a cylindrical lens in the corresponding direction (FIGS. 4, 5).

Figure 4:
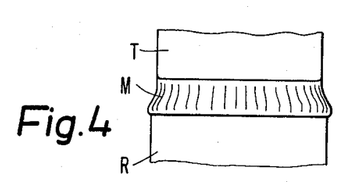
FIG. 4 illustrates the production of a disc-shaped or plate-shaped monocrystal according to the present invention.
Figure 5:
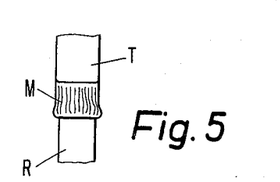
FIG. 5 is a side view of the monocrystal of FIG. 4.

To briefly define FIGS. 4 and 5, these are side views of disks with mainly rectangular cross-sections. Different zones are as follows: Top zone (T) — single crystal, shaded middle zone (M) — melt, lower zone — raw material (R).

Figure 8A:
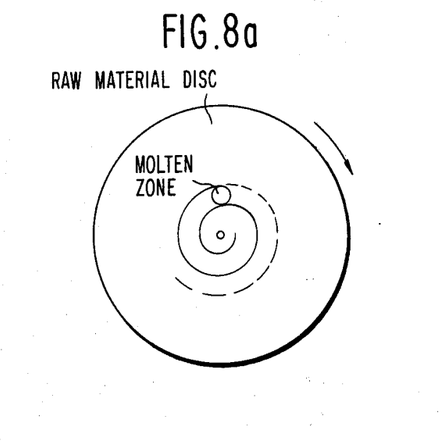
FIGS. 8a and 8b, which are upper-views and cross-sections, respectively, illustrate an embodiment of the present invention wherein the raw material is in the form of a disc and the irradiation with a laser beam is accomplished by rotating the disc and irradiating the disc with the laser beam in a sprial fashion.
Figure 8B:
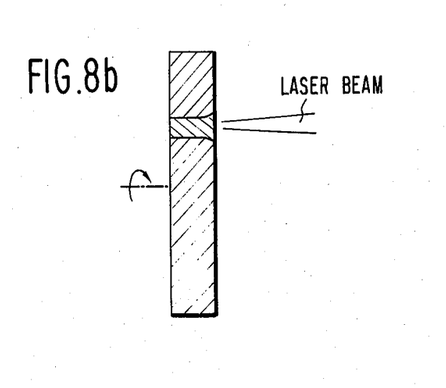
Figure 9:
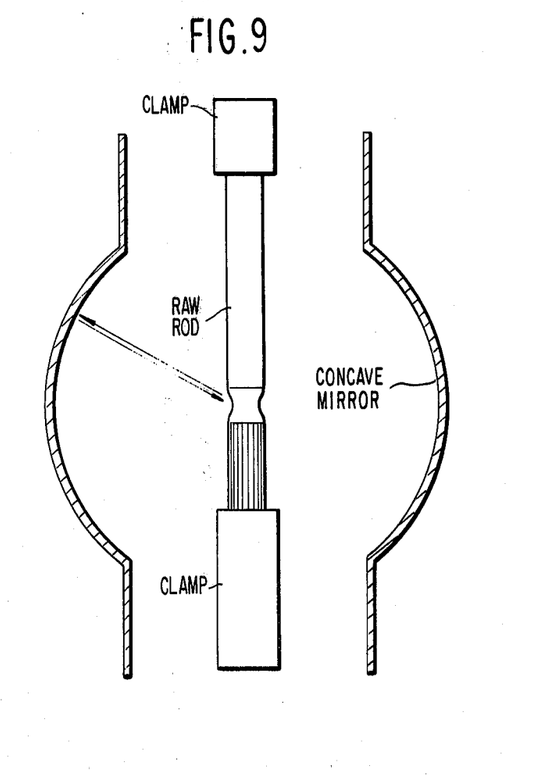
FIG. 9 illustrates an embodiment of the present invention wherein the raw material is at least partially surrounded with a concave mirror capable of reflecting radiation loss from the surface of the raw material upon irradiation from the laser beam, whereby heat radiation loss is reduced.

Finally, it is possible to grow the crystal in the form of a rotating, circular disk. A correspondingly large raw disk may be used with the melting zone being guided from the middle to the exterior of the disk in a spiral fashion (or vice versa). Alternatively, one can build up a monocrystalline disk, starting with a rod-shaped seed, in such a manner that one directs the laser beam at the beginning at one point on the circumference of the slowly rotating seed, and later at the crystalline disk, while feeding the material to be melted in rod form to the area of laser application. In this second embodiment, the raw material (rod) is built up on the seed crystal.

Basic Operational Procedure of Examples

A sintered rod of the material to be transformed into monocrystalline form was placed in the clamps of the growing device. Both clamps at first rotated in the same direction. A $CO_2$ laser beam was directed at a point below the midpoint of the rod by means of a reflector with a focus of 1 m. The diameter of the laser beam was 2 mm as it hit the rod. Laser output was controlled so that a melting zone with a height of about 7 mm developed within about 1 minute. The laser output required for this was 400 w.

After the melting zone had been produced, the direction of rotation of one rod end was reversed during operation. The relative speed of rotation of the two rod ends with respect to each other was 60 rpm. This relative rotation speed of the two rod ends provides for good mixing of the melting zone. The melting zone was moved upward through the rod at a speed of about 10 mm/hour. This was done either by means of the synchronous downward movement of both rod ends or by deflecting the laser beam with the above-mentioned reflector. (By running the melting zone through the sintered rod, which consisted of aluminum oxide, the latter was converted into a sapphire monocrystal.)

To compensate for heat radiation losses, the rod, that is the material to be grown in monocrystalline form, was surrounded with a furnace. The furnace had a recess through which the laser beam was directed at the material to be grown.

The furnace temperature was maintained at an elevated temperature above 1,750°C for sapphire, to compensate for heat losses due to radiation. The radial temperature gradient was thus greatly reduced. It was thus possible to grow substantially strain-free crystals. As an effect of the zone refining process, the impurities contained in the sinter rod were retained or absorbed by the melting zone and carried by the latter, so that a substantially purified product monocrystal was obtained.

In the following specific case, the details of operation were the same as in the "Basic Operational Procedure of the Examples," except as mentioned otherwise.

EXAMPLE 1

A sinter rod of barium strontium niobate ($Ba_{0.3}Sr_{0.7}Nb_2O_6$) was prepared with a diameter of 8 mm and a length of 200 mm. By heating with a laser beam 2 mm in diameter, a temperature of 1,600°C was reached in the middle of the molten zone. The furnace temperature was 1,400°C. A monocrystal with a diameter of 7 mm and a length of 200 mm was obtained.

The procedure of Example 1 was followed in the remaining examples, unless otherwise noted.

EXAMPLE 2

Following the procedure of Example 1 barium sodium niobate monocrystals were prepared. The temperature in the middle of the molten zone was 1,550°C, and the furnace temperature 1,350°C. The dimensions of the sinter rod and the obtained monocrystal were the same as for barium strontium niobate in Example 1.

EXAMPLE 3

Following the procedure of Example 1, lithium niobate ($Li\,Nb\,O_3$) monocrystals were prepared. The temperature in the middle of the molten zone was 1,320°C, and the furnace temperature was 1,170°C. The dimensions of the sinter rod and of the obtained monocrystal were the same as for the barium strontium niobate.

EXAMPLE 4

Following the procedure of Example 1 potassium ortho tantalate ($K\,Ta\,O_3$) monocrystals were prepared. However, the received crystal was drawn at a speed of 4 mm/hour and the sinter rod was pushed in the drawing direction at a speed of 20 mm/hour. As a result a crystal of 15 mm in diameter and 35 mm length was obtained. The temperature in the middle of the molten zone was 1,450°C and the furnace temperature 1,250°C.

EXAMPLE 5

Following the procedure of Example 1 strontium titanate ($Sr\,Ti\,O_3$) monocrystals were prepared. A drawing speed of 5 mm/hour and a pushing speed of 20 mm/hour were used. A crystal of 14 mm in diameter and 45 mm length was obtained. The temperature in the middle of the molten zone was 2,080°C and the furnace temperature was 1,850°C.

EXAMPLE 6

Following the procedure of Example 1 calcium wolframat ($Ca\,W\,O_4$) monocrystals were prepared. A drawing speed of 10 mm/hour and a pushing speed of 12 mm/hour were used. A monocrystal of 8.5 mm in diameter and 160 mm length was obtained. The temperature in the middle of the molten zone was 1,650°C and the furnace temperature was 1,400°C.

EXAMPLE 7

Following the procedure of Example 1 lead molybdate ($Pb\,Mo\,O_4$) monocrystals were prepared. The drawing speed was 10 mm/hour; pushing speed 20 mm/hour. A monocrystal of 10.5 mm in diameter and 95 mm length was obtained. The temperature in the middle of the molten zone was 1,150°C and the furnace temperature was 900°C.

EXAMPLE 8

Following the procedure of Example 1 yttrium gallate ($Y_3\,Ga_5\,O_{12}$) monocrystals were prepared. The drawing speed was 4 mm/hour and the pushing speed was 10 mm/hour. A crystal of 12 mm in diameter and 75 mm length was obtained. The temperature in the middle of the molten zone was 1,770°C and the furnace temperature was 1,550°C.

Gadolinium gallate ($Gd_3\,Ga_5\,O_{12}$) yttrium gallate was produced in a similar manner.

EXAMPLE 9

Following the procedure of Example 1 yttrium aluminate ($Y\,Al\,O_3$ or $Y_3\,Al_5\,O_{12}$) monocrystals were prepared. The drawing speed was 10 mm/hour and pushing speed was 10 mm/hour. A monocrystal of 7 mm diameter and 19 cm length was obtained. The temperature in the middle of the molten zone was 2,010°C and the furnace temperature was 1,680°C.

EXAMPLE 10

Following the procedure of Example 1 yttrium silicate ($Y_4 Si_3 O_{12}$) monocrystals were prepared. The drawing speed was 8 mm/hour and the pushing speed was 10 mm/hour. A crystal of 8.5 mm in diameter and 15 cm length was obtained. The temperature in the middle of the molten zone was 1,860°C and the furnace temperature was 1,680°C.

In all the above examples, the sinter rod and the obtained monocrystals were moved downward, the laser beam remaining in a fixed position.

The procedure of the examples may be modified so that the melting zone is run through the clamped rod from top to bottom. This can be done either by synchronous movement of the two rod ends, respectively, seed crystal and rod, or by deflecting the laser beam.

The conversions into monocrystals, described herein, are examples of the process of the present invention.

These examples describe the conversion of the previously mentioned class of coordinative bound salts of metallic acids into their monocrystalline form.

To further expand on the process of the present invention, especially with respect to doping, generally any prior art doping process which has been used in the zone melting process may be used in the process of the present invention. In the most preferred embodiment, the doping material is present on the surface of the raw material prior to melting thereof. However, as will be apparent to one skilled in the art, the doping material could be intermixed with the raw material, etc. Further, when initially "drawing" the melt, it is advantageous to produce a "thin neck" of the melt, i.e. by drawing the two sleds apart or alternating the speed thereof. If this is done, dislocation free crystals are produced.

The maintaining of a low temperature gradient in the melt and/or crystalline material avoids the possible formation of stresses in the product, due to disruptive radial temperature changes. This, of course, is done by the utilization of a furnace or a concave reflecting mirror.

The melt zone is completely molten throughout the entire cross-section of the rod. obviously, the length of the melt zone will depend upon the laser power irradiated into the molten material. It will be obvious to one skilled in the art that if the melt zone is increased too greatly, it is possible that the zone will not be maintained in a coherent state. This of course is directly related with the surface tension of the molten material.

As will be gathered from the heretofore offered detailed explanation of the invention, the "raw material" of the present invention can merely be a single sintered or pressed rod, disc, etc. which is not in monocrystalline form. After processing by the technique of the present invention, the end product will be a monocrystal, but will not have a predetermined orientation, as is obtainable with the use of a seed crystal.

Of course, the present invention also finds application to a rod, disc, or the like, which is already partly monocrystal (but in an impure state). After treatment by the present invention, the end monocrystal will have a predetermined monocrystal structure. In essence, the present process will, in this instance, "purify" the impure partly monocrystal rod and reduce the number of crystal dislocations occurring therein.

Figure 6:
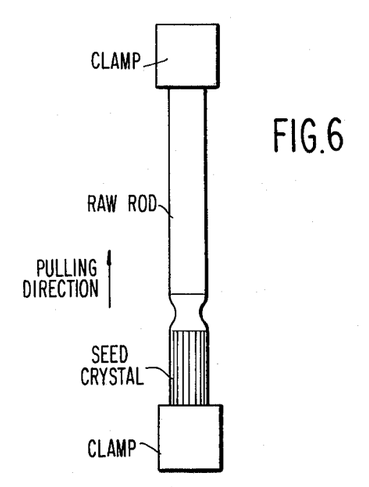
FIG. 6 illustrates an embodiment of the present invention where the raw material comprises a raw rod and a seed crystal.
Figure 7:
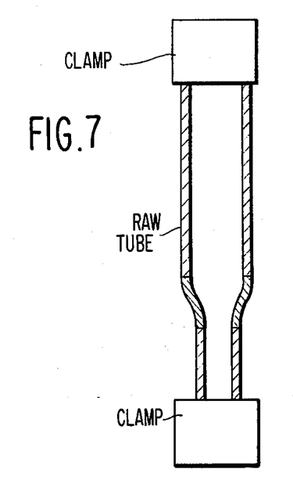
FIG. 7 illustrates an embodiment of the present invention where the raw material is in the shape of a tube.

In another embodiment of the present invention, wherein a seed crystal is utilized, such a process is typically started with two "members", the seed crystal (which was heretofore referred to by numeral 10) and the raw material (the blank, heretofore referred to by numeral 12). These two materials may be brought into intimate contact, separated by a very small distance, or actually brought into physical contact. Of course, they are then heated with the laser, so that the melt (heretofore referred to as numeral 9) zone can form. As the melt zone is moved, either by moving the two materials or the laser beam, a pure monocrystal will result having the orientation of the seed crystal. This pure monocrystal which is formed has heretofore been referred to as member 11. For all substantial purposes, with respect to crystal orientation, there will be no distinguishable difference between the seed crystal 10 and the monocrystal product 11, although the seed crystal is utilized from the beginning of the process, and the monocrystal 11 is "grown" by the process.

As a final point, it will be noted that the present invention has been referred to as an improvement on the wellknown floating zone melting process. However, the present invention enables monocrystalline discs to be formed, which could not be formed with the prior art floating zone melting process.

What is claimed is:

1. In a process for the production of a dielectric monocrystal from a raw material comprising a dielectric salt of a coordinative bound metallic acid in accordance with the floating zone melt process, the improvement which comprises melting the portion of said raw material which is to comprise the floating zone melt by irradiation with a laser beam.

2. The process of claim 1 wherein said dielectric monocrystal is produced from the raw material comprising a dielectric salt, and said dielectric salt is selected from the group consisting of niobates, tantalates, titanates, wolframates, molybdates, gallates, aluminates, silicates and mixtures of these materials.

3. The process of claim 1 wherein said dielectric monocrystal is produced from a raw material comprising a dielectric salt, and said dielectric salt is selected from the group consisting of barium sodium niobate, barium strontium niobate, lithium niobate, potassium ortho tantalate, strontium titanate, calcium wolframate, lead molybdate, yttrium gallate, yttrium aluminate, yttrium silicate and mixtures of these materials.

4. The process of claim 1 where zone melting is in a vacuum.

5. The process of claim 1 where zone melting is under a protective gas.

6. The process of claim 1 where zone melting is in air.

7. The process of claim 1 wherein said laser beam is generated by a $CO_2$ laser.

8. The process of claim 1 wherein said dielectric monocrystal is produced from a raw material comprising a dielectric salt, wherein the monocrystal is doped during the zone melting process by a doping material associated with the raw material, said doping material being mixed into the melt and thereby incorporated into the monocrystal during irradiation by said laser beam.

9. The process of claim 1 wherein said raw material comprises a raw rod and a seed crystal.

10. The process of claim 1 wherein said raw material is in the shape of a disc or plate.

11. The process of claim 1 wherein said raw material is in the shape of a tube.

12. The process of claim 1 wherein said raw material is in the shape of a rod.

13. The process of claim 1 wherein said raw material is in the form of a disc, and said irradiation with a laser beam is accomplished by rotating said disc and irradiating said disc with said laser beam in a spiral fashion.

14. The process of claim 1 which further comprises maintaining said raw material in a furnace wherein the temperature is maintained below the melting temperature of the monocrystal material formed, said furnace being provided with aperture means for the passage of the laser beam onto the raw material.

15. The process of claim 14 wherein the temperature difference between the raw material and the furnace is less than about 500°C.

16. The process of claim 1 which further comprises at least partially surrounding said raw material with a concave mirror capable of reflecting radiation lost from the surface of said raw material upon irradiation from said laser beam, whereby heat radiation loss is reduced.

17. The process of claim 1 wherein said raw material is selected from the group consisting of lithium niobate, barium-sodium-niobate and barium-strontium-niobate.

18. In a process for the production of a monocrystal from a raw material in accordance with the floating zone melt proccess, the improvement which comprises melting the portion of said raw material which is to comprise the floating zone melt by irradiation with a laser beam.

19. The process of claim 1 wherein said raw material has a melting point greater than 2,000°C.

20. The process of claim 1 wherein said laser is substantially the sole source of heat for said melting.

21. The process of claim 1 wherein said raw material is in the shape of a disc or plate, and said monocrystal is in the shape of a disc or plate.

22. The process of claim 1 wherein said raw material is in the shape of a tube, and said monocrystal is in the shape of a tube.

23. The process of claim 1 wherein said raw material is in the form of a disc, and said irradiation with a laser beam is accomplished by rotating said disc and irradiating said disc with laser beam in a spiral fashion, said monocrystal having the shape of the disc.

24. The process of claim 1 wherein said raw material comprises a first component which is substantially more volatile than a second component therein, said first component volatilizing from the raw material during melting to form a vapor phase, and being reintroduced into said melting raw material by maintaining a separate source of said first component in close adjacency to said melting raw material, whereby said first component is an equilibrium between said melting raw material and said vapor phase.

25. The process of claim 18 wherein said raw material has a melting point greater than 2,000°C.

26. The process of claim 18 wherein said laser is substantially the sole source of heat for said melting.

27. The process of claim 18 wherein said raw material is in the shape of a disc or plate, and said monocrystal is in the shape of a disc or plate.

28. The process of claim 18 wherein said raw material is in the shape of a tube, and said monocrystal is in the shape of a tube.

29. The process of claim 18 wherein said raw material is in the form of a disc, and said irradiation with a laser beam is accomplished by rotating said disc and irradiating said disc with said laser beam in a spiral fashion, said moncrystal having the shape of the disc.

30. The process of claim 18 wherein said raw material comprises a first component which is substantially more volatile than a second component therein, said first component volatilizing from the raw material during melting to form a vapor phase, and being reintroduced into said melting raw material by maintaining a separate source of said first component in close adjacency to said melting raw material, whereby said first component is an equilibrium between said melting raw material and said vapor phase.

31. The process of claim 18 wherein said melting is conducted in air.

* * * * *